(12) United States Patent
Huang et al.

(10) Patent No.: US 7,171,360 B2
(45) Date of Patent: Jan. 30, 2007

(54) BACKGROUND LEARNING OF SPEAKER VOICES

(75) Inventors: Chao-Shih Huang, Tauyan (TW); Ya-Cherng Chu, Taipei (TW); Wei-Ho Tsai, Taipei (TW); Jyh-Min Cheng, Hsinchu (TW)

(73) Assignee: Koninklijke Philips Electronics N.V., Eindhoven (NL)

( * ) Notice: Subject to any disclaimer, the term of this patent is extended or adjusted under 35 U.S.C. 154(b) by 854 days.

(21) Appl. No.: 10/140,499

(22) Filed: May 7, 2002

(65) Prior Publication Data

US 2003/0088414 A1    May 8, 2003

(30) Foreign Application Priority Data

May 10, 2001    (EP)    ................................ 01201720

(51) Int. Cl.
  *G10L 15/06* (2006.01)
  *G10L 17/00* (2006.01)
(52) U.S. Cl. .................... 704/245; 704/239; 704/246
(58) Field of Classification Search ................ 704/236, 704/239, 240, 243, 244, 245, 246, 250, 256.2, 704/270, 273, 275
See application file for complete search history.

(56) References Cited

U.S. PATENT DOCUMENTS

| | | | | |
|---|---|---|---|---|
| 5,167,004 A * | 11/1992 | Netsch et al. | ................ | 704/200 |
| 5,522,012 A * | 5/1996 | Mammone et al. | ......... | 704/250 |
| 5,774,859 A * | 6/1998 | Houser et al. | .............. | 704/275 |
| 5,862,519 A * | 1/1999 | Sharma et al. | .............. | 704/231 |
| 5,895,447 A | 4/1999 | Ittycheriah et al. | ......... | 704/231 |
| 5,983,178 A | 11/1999 | Naito et al. | ................. | 704/245 |
| 6,073,096 A * | 6/2000 | Gao et al. | ................... | 704/245 |
| 6,233,555 B1 * | 5/2001 | Parthasarathy et al. | ..... | 704/249 |
| 6,324,512 B1 * | 11/2001 | Junqua et al. | .............. | 704/275 |
| 6,389,392 B1 * | 5/2002 | Pawlewski et al. | ......... | 704/241 |
| 6,415,257 B1 * | 7/2002 | Junqua et al. | .............. | 704/275 |
| 6,480,825 B1 * | 11/2002 | Sharma et al. | .............. | 704/270 |
| 6,519,561 B1 * | 2/2003 | Farrell et al. | ............... | 704/232 |
| 6,539,352 B1 * | 3/2003 | Sharma et al. | .............. | 704/249 |
| 6,618,702 B1 * | 9/2003 | Kohler et al. | ............... | 704/250 |
| 6,760,701 B1 * | 7/2004 | Sharma et al. | .............. | 704/249 |
| 2003/0009333 A1 * | 1/2003 | Sharma et al. | .............. | 704/246 |
| 2006/0074657 A1 * | 4/2006 | Huang | ........................ | 704/246 |

OTHER PUBLICATIONS

McLaughlin et al., "Automatic Speaker Clustering from Multi-Speaker Utterances," 1999 IEEE International Conference on Acoustics, Speech, and Signal Processing, 1999. ICASSP '99. Mar. 15-19, 1999. vol. 2, pp. 817 to 820.*

Reynolds et al: "Blind Clustering Of Speech utterances Based On Speaker And Language Characteristics," International Conference On Spoken Speech Language Processing (ICSLP '98, Sydney), Nov. 1998, pp. 3193-3196.

* cited by examiner

Primary Examiner—Martin Lerner

(57) ABSTRACT

A speaker identification system includes a speaker model generator 110 for generating a plurality of speaker models. To this end, the generator records training utterances from a plurality of speakers in the background, without prior knowledge of the speakers who spoke the utterances. The generator performs a blind clustering of the training utterances based on a predetermined criterion. For each of the clusters a corresponding speaker model is trained.

A speaker identifier 130 identifies a speaker determining a most likely one of the speaker models for an utterance received from the speaker. The speaker associated with the most likely speaker model is identified as the speaker of the test utterance.

20 Claims, 3 Drawing Sheets

BACKGROUND LEARNING OF SPEAKER VOICES

The invention relates to automatic identification of speakers by receiving a test utterance; determining a most likely one of a plurality of speaker models for the test utterance; and identifying the speaker associated with the most likely speech model as the speaker of the test utterance.

Speaker identification is getting increasingly important. Traditionally speaker identification has been used for security purposes, for example to verify the identity of a speaker based on voice characteristics. As more and more applications of voice control are developed for CE (consumer electronics) equipment, speaker identification can also play an important role in further simplifying the interaction with CE equipment.

In conventional speaker-identification (speaker-ID) tasks, models for specific speakers are trained using enrollment data of clients. Usually, Hidden Markov Models (HMMs) are used to model sub-word units, such as phonemes or diphones. To achieve good performance, a reliable system needs a large amount of enrollment data to characterize the speakers' voices. In particular, data from a number of different sessions is desirable, because speakers' voice characteristics change significantly from session to session. Each speaker trains its own model. As such the speaker must have enrolled to the system before actual training takes place.

Once the models are trained, an utterance of a speaker to be identified or verified is compared against all speaker models. The identity of the speaker is determined by locating the model with the highest likelihood for the utterance, and retrieving the identity of the speaker associated with the model.

Since it is annoying for users to spend much time training the system, there is a need to minimize the demands on the speaker and the amount of training data. In itself, various approaches have been proposed, which aim at producing better parameter estimates of speaker modeling when only sparse enrollment data is available. These systems nevertheless require the user to enroll and train the system. For CE systems this may still be a too high barrier for users and hinder acceptance of the system. It aslo makes the system difficult to operate for casual users who are familiar with enrollment.

It is an object of the invention to provide a method and system capable of automatically identifying speakers without the speakers needing to enroll by explicitly training the system.

To meet the object of the invention, the plurality of speaker models are generated in the background by:

receiving training utterances from the plurality of speakers in the background, without prior knowledge of the speakers who spoke the respective training utterances;

blind clustering of the training utterances based on a predetermined criterion; and training for each of the clusters a corresponding speaker model; each of the models representing a speaker.

In the approach according to the invention speaker-specific models can be trained without relying on the enrollment data, but instead using off-line collected speech of speakers. To achieve this, the system is designed with capability of collecting, classifying and learning distinct speaker voices on the fly without human intervention. Since the learning is a background or hidden procedure, it is referred to as background learning. In the description the background learning will focus on batch learning. Batch learning is performed at a time when enough speech data of all speakers to be identified has been collected in the background. The background learning is advantageously used in a voice control system. Most state of the art speaker-independent voice control systems can be used by a user without having to train the system first. While the user is using the voice control system the commands uttered by the user are recorded and used for the background learning according to the invention. For certain other applications it may even be possible that when the user obtains a new system equipped with the background learning according to the invention, the system automatically starts collecting utterances from users, for instance by recording all speech received via a microphone. To this end the system may be equipped with software to distinguish between speech and other sounds. The system may start the recording without any user intervention or after having been activated by a user. In either case the system is initially not provided with information on who is actually speaking the utterances. For the invention it is also not required that the users speak predetermined phrases, like passwords. It is assumed that each of the collected utterances contains speech segments from a single speaker. In other words, attributes of each utterance can be exclusively judged as originating from only one speaker.

Once the system has collected enough data, according to a predetermined criterion, the batch learning includes blind clustering of the speech data according to speaker characteristics, defined by a predetermined criterion. This is optionally followed by training speaker-specific models using self-tagged data. This batch learning technique is employed when a system needs to be initiated in an unsupervised way. Alternatively, the background learning technique according to the invention can be used in an 'incremental learning' form. This involves adding new users to the current system or collecting new speech data for adapting prior speaker models. The system performs pre-verification to determine whether the new collect data are of already identified speakers. If so, the data is optionally used to adapt the prior speaker models. Otherwise the data is clustered blindly and thereby new speaker models are generated.

In this way the troublesome accuracy/enrollment trade-off is circumvented and thus user efforts are reduced.

It should be noted that U.S. Pat. No. 5,862,519 describes a method of blind clustering of speech for a speaker identification/verification system. In this system the blind clustering is used for automatically segmenting utterances, typically passwords, into sub-word units. In the known system, the blind segmentation is used to segment an unknown password phrase into sub-word units based on a homogeneity property, where the segmentation boundaries are unknown. The password phrase comes from a client speaker. It means the speaker is known to the system and is actually training the system. In the system according to the invention blind clustering is used to group together utterances from the same-speaker, where the utterances are part of a pool of utterances from several speakers. A collection of utterances is blindly split into several speaker-related clusters. There is no prior knowledge about speakers during the clustering.

According to an aspect of the present invention, a model is created of each utterance received in the background. Each of the utterances is also compared against all such models. This gives for each utterance a vector of likelihoods. The discrimination is increased by replacing the likelihoods by a ranking based on the likelihoods. The distance between the ranking vectors forms the general criterion for distin guishing between different speakers' utterances, since it has been found that the distance between ranking vectors is smaller if the ranking vectors relate to utterances of the same speaker than if the ranking vectors relate to utterances from different speakers. Based on this criterion the utterances are clustered. For each of the clusters a model is created. This model is assumed to be specific for one speaker. It will be appreciated that if the ranking is such that a high likelihood gives a high ranking value, same speaker utterances show up as a minimum distance between the ranking vectors. A suitable ranking of the elements of the likelihood vector results in a good discriminative power.

According to an aspect of the present invention, a threshold is used in the ranking based on the expected number of utterances per cluster. This helps the clustering process.

According to an aspect of the present invention, the user can enroll using his/her voice. Automatically, the most likely model is determined and the identity of the user is stored for this model, making enrolment fast and easy.

According to an aspect of the present invention, during the enrolment it is tested whether the model has already been trained sufficiently. If not, some further utterances are received and the partially completed model is adapted to the new utterances. In this way enrolment is also quick compared to having to start from scratch.

According to an aspect of the present invention, blind clustering is stopped if a model is trained sufficiently in the sense that a speaker can be identified with sufficient confidence.

According to an aspect of the present invention, once a model has been trained sufficiently, the speaker is automatically approached to specify its identity, so that the speaker can be identified automatically from that moment on. In this way, the speaker does not even need to take any initiative for enrolling.

As defined in an aspect of the present invention, identification of a speaker results in automatically retrieving a personal profile for interacting with a CE device. This makes personalized use of CE equipment possible in a very user friendly way.

These and other aspects of the invention will be elucidated with reference to the drawings.

Figure 1:
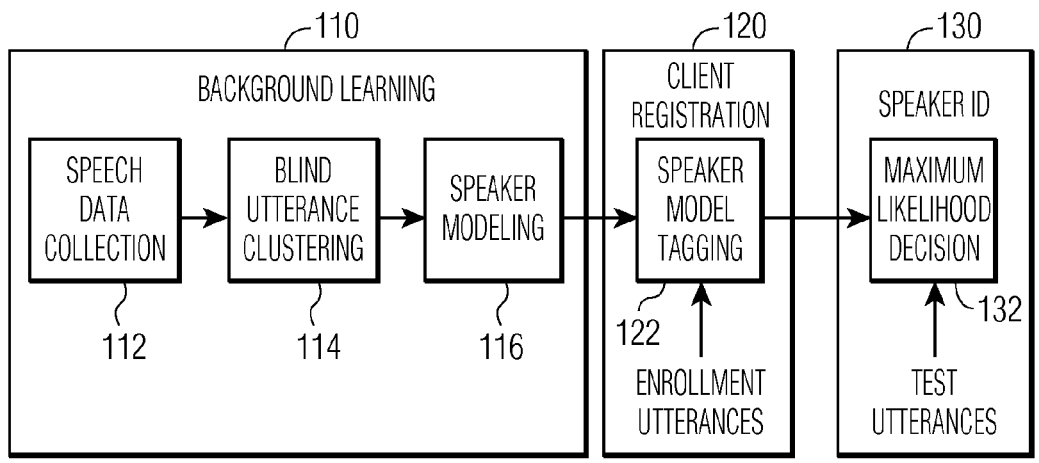
FIG. 1 shows a block diagram of the speaker identification system according to the invention.

FIG. 1 shows a block diagram of the speaker identification system according to the invention. The system includes three major blocks operated sequentially in time: background learning 110, speaker registration 120, and speaker identification 130. The background learning includes speech data collection 112, followed by blind clustering 114 of speech utterances based on speaker characteristics. The blind utterance clustering aims at grouping unknown utterances when no prior information is available regarding the speaker identities or even the speaker population size. Detail of this component will be described below. Once the clusters are generated, speaker modeling 116 ensures that utterances in each of these clusters are used to train a respective model pertained to a possible speaker. Preferably, the models are trained using the traditional Gaussian mixture modeling (GMM) technique, in which a set of M clusters is represented by GMM's $\{\lambda_1^c, \lambda_2^c, \ldots, \lambda_M^c\}$. Persons skilled in the art will appreciate that also other models generally known in the field of speech processing may be used. No details of specific models are given since such models are generally known. In itself the hardware used to perform the invention is conventional, for instance a micro-processor or DSP loaded with suitable software and, optionally, an A/D converter and microphone for receiving the speech may be used. The software may be embedded, e.g. stored in ROM, or loaded from a background storage, such as a hard disk or CD-ROM, or via a network, such as the Internet.

Since the background learning is completed in an unsupervised way, initially no information is present regarding which model is associated with which speaker. To perform subsequent speaker identification that really identifies the actual speaker, it is desired to tag each of the models with its corresponding speaker identity as is shown in block 122. This can be done when the speaker performs a formal registration. In this phase, the system will ask each of the speakers to provide few enrollment data, for example, only one arbitrary utterance y. The system assigns the most adequate model to the speaker based on this enrollment utterance. In other words, the speaker "adopts" one of the speaker models by means of his/her voice. To achieve this, preferably a maximum likelihood decision rule is employed, resulting in selecting the most likely speaker model. The system decides in favor of the model for speaker $S_i$ satisfying $$\lambda_i^S = \arg\max_{1 \le j \le M} p(y | \lambda_j^C). \tag{1}$$

It will be appreciated that for certain applications it is not necessary to know the exact identity of a speaker. It may be sufficient to be able to distinguish between speakers. As such, block 120 is optional. If no enrolment has taken place, a speaker can simply be identified by a number associated with each respective speaker model.

During identification shown in block 130, the system in block 132 takes as input an unknown test utterance, say, z, and produces as output the identity of the hypothesized speaker satisfying $$\hat{S} = \arg\max_{1 \le k \le Q} p(z | \lambda_k^S), \tag{2}$$

where Q is the number of users. This means that the identity of the speaker associated with the most likely speaker model is retrieved.

The Utterance Clustering Cues

Let $\{x_1, x_2, \ldots, x_N\}$ denote a set of N speech utterances from P surrounding speakers $\{S_1, S_2, \ldots, S_P\}$, where N>P, and P may be unknown in advance. The objective of the utterance clustering is to produce a partitioning of the utterances into a set of M clusters such that all the utterances in a cluster are, preferably, from only one speaker. Ideally, M=P such that all the utterances from a specific speaker can be grouped into a single cluster. Toward this end, it is a prerequisite to identify relevant aspects of speaker characteristics carried by each of the utterances and thereby produce some measurements with small difference between utterances of the same speaker and with larger difference between utterances of different speakers. In line with the success of Gaussian mixture classifier in the text-independent speaker identification, the inventors have realized that a Gaussian Mixture Model (GMM) formed from an utterance can also be used to characterize acoustic space corresponding to a speaker identity rather than a spoken message. To advance with this, speech utterances are first converted from their digital waveform representations into streams of feature vectors, and each of these utterances is in turn modeled by a Gaussian mixture density. Such a modeling is well-known and not described in detail here. Let $\{\lambda_1^U, \lambda_2^U, \ldots, \lambda_N^U\}$ denote the parameter set of GMMs formed from the N utterances. Next, the likelihood of each utterance $x_i$ is computed against each model $\lambda_j^U$ as $L_{ij} = \log p(x_i|\lambda_j^U)$, $1 \leq i, j \leq N$. Experiments have indicated that the likelihoods are generally large when utterances and test models are associated the same speaker and small otherwise, i.e., $$L_{ij} > L_{ik}, \text{ if } S(x_i) = S(x_j), \text{ and } S(x_i) \neq S(x_k), \tag{3}$$

where $S(x_i)$ is the speaker attribute of $x_i$. However, this criterion is not always valid. To obtain a more reliable cue in partitioning speech utterances, it is preferred to use a ranking mechanism as defined further below.

Figure 2:
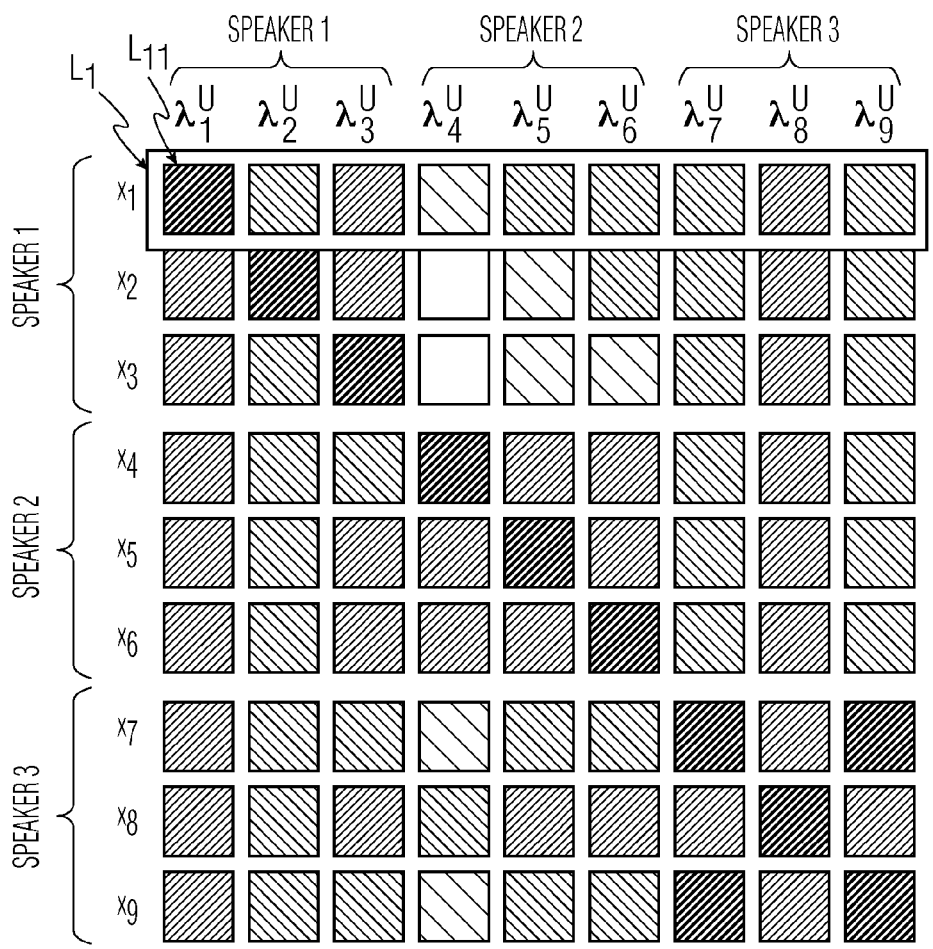
FIG. 2 illustrates the discriminative powers of the likelihood vectors.

Let $L_i = [L_{i1} L_{i2} \ldots L_{iN}]^T$ be an N-dimensional vector. It has been found that that $L_i$ and $L_j$ are much more "similar" in some sense when $x_i$ and $x_j$ are of the same speaker and "dissimilar" otherwise. To illustrate this, a gray scale representation of the model likelihoods is depicted in FIG. 2, in which nine utterances from three speakers (three utterances per speaker) were analyzed. The nine utterances are shown vertically and the nine models horizontally. The black region represents a higher likelihood and the white region a smaller one. Relative gray scale magnitudes in the representation are evident from comparing entries in the intermediate ranking matrix for FIG. 2 provided further below. It can be seen that the utterances from the same speaker have a more similar "likelihood pattern" than those of the utterances from different speakers. As such a measure of 'dissimilarity' between the likelihood vectors can be used as the criterion during clustering. Ideally, if the stochastic model $\lambda$ can capture the most important characteristic features of speaker voices, the value of $L_{ij}$ is large when $x_i$ and $\lambda_j$ are associated with the same speaker and is small otherwise. However, practically, it is difficult to guarantee that $L_{ij} > L_{ik}$ for all Speaker($x_i$) =Speaker($x_j$) and Speaker($x_i$)≠Speaker($x_k$). As an example shown in FIG. 2, $x_1$ and $x_2$ are produced by the same speaker while x8 is originated from another speaker; unfortunately, $L_{18} > L_{12}$ in this case. Therefore, it is unreliable to determine if two utterances are of the same speaker simply based on a single model likelihood. To alleviate this problem, the similarity between two utterances is measured by taking out-of-pair utterances into account instead of single model likelihood. The basic principle is built upon visual inspection from the likelihood pattern.

As shown in FIG. 2, a general trait is that two vectors $L_i$ and $L_j$ are much more "similar" in a sense when utterance $x_i$ and $x_j$ are of the same spoken language and are "dissimilar" otherwise. However, the question is how to characterize such visual trait. Due to the fact that the dynamic range of likelihood is quite large, it is inappropriate to measure the utterance-pair distance directly by using the Euclidean distance taken from two L-vectors. For example, assume that utterance $y_1$ and $y_2$ are produced by the same speaker and $y_3$ another speaker. The resulting L-vectors are probably like this (using a log likelihood):

| |
|---|
| $L_1 = [\ L_{11}\ L_{12}\ L_{13}\ ]^T = [\ -1000 \quad -1111 \quad -3222]^T$ |
| $L_2 = [\ L_{21}\ L_{22}\ L_{23}\ ]^T = [\ -5111 \quad -4000 \quad -8222]^T$ |
| $L_3 = [\ L_{31}\ L_{32}\ L_{33}\ ]^T = [\ -900 \quad -800 \quad -300]^T$ |

Although $L_{12} > L_{13}$ and $L_{21} > L_{23}$, $\|L_1 - L_2\| > \|L_1 - L_3\|$. The preferred approach to cluster speech utterances described in more detail below overcomes these problems.

The Utterance Clustering Procedure

First, for each utterance $x_i$, its model likelihoods $L_{ij}$, $1 \leq j \leq N$ are ranked according to the rule of that a larger ranking value is assigned for a higher priority. The ranking of the likelihood $L_{ij}$ is relative to the likelihoods of the other elements of the likelihood vector $L_i$. As such the likelihood vector $L_i$ for training utterance $x_i$ results in a corresponding ranking vector $F_i$. In a preferred embodiment, an intermediate ranking vector $R_i$ is calculated, where the vector element values $R_{ij}$ are chosen from the integers 1 to N in dependence on the likelihood $L_{ij}$ relative to the likelihoods of the other elements of the likelihood vector $L_i$. In the preferred embodiment, $R_{ik} = 1$, if $k = \arg\max_j L_{ij}$, and $R_{ik} = N$, if $k = \arg\min_j L_{ij}$. Each ranking value is normally only used once, and assigned from 1 to N. Based on this intermediate ranking vector, the actual ranking vector $F_i = [F_{i1}, F_{i2}, \ldots, F_{iN}]^T$ for each utterance $x_i$, is defined as $F_{ij} = 1/R_{ij}$.

A further improvement is achieved by increasing the discrimination:

$$F_{ij} = \begin{cases} 1/R_{ij}, & \text{if } R_{ij} < \eta \\ 0, & \text{otherwise} \end{cases}, \tag{4}$$

where $\eta$ is an integer that represents the expected number of utterances per cluster. Proceeding in this way, a general criterion for distinguishing from different speakers' utterances can be derived, $$D(F_i, F_j) < D(F_i, F_k), \text{ if } S(x_i) = S(x_j), \text{ and } S(x_i) \neq S(x_k) \tag{5}$$

where $D(F_i, F_j)$ is a suitable distance measure for $F_i$ and $F_j$.

Referring to the example given above, the corresponding ranking vectors are:

| |
|---|
| $F_1 = [\ 1 \qquad\qquad ½ \qquad\qquad ⅓\ ]^T$ |
| $F_2 = [\ ½ \qquad\qquad 1 \qquad\qquad ⅓\ ]^T$ |
| $F_3 = [\ ⅓ \qquad\qquad ½ \qquad\qquad 1\ ]^T$ |

In this example, $\eta = 3$. This gives $\|F_1 - F_2\| = 0.5$, $\|F_1 - F_3\| = 0.89$, and $\|F_2 - F_3\| = 0.72$.

Obviously, $y_1$ and $y_2$ are the closest pair.

The use of thresholding illuminates the fact that only larger model likelihoods are useful to clarify the relation between one utterance and its companions with the same true speaker identities. To illustrate this, the example shown in FIG. 2 is used. The intermediate ranking matrix $R_{ij}$ for this example is

|       |   |   |   |   |   |   |   |   |   |
|-------|---|---|---|---|---|---|---|---|---|
| $x_1$ | 1 | 4 | 2 | 9 | 6 | 8 | 7 | 3 | 5 |
| $x_2$ | 2 | 1 | 3 | 9 | 8 | 6 | 7 | 4 | 5 |
| $x_3$ | 2 | 4 | 1 | 9 | 7 | 8 | 6 | 3 | 5 |
| $x_4$ | 5 | 9 | 8 | 1 | 3 | 2 | 7 | 4 | 6 |
| $x_5$ | 5 | 9 | 6 | 4 | 1 | 2 | 8 | 3 | 7 |
| $x_6$ | 5 | 9 | 8 | 3 | 2 | 1 | 7 | 4 | 6 |
| $x_7$ | 4 | 8 | 5 | 9 | 6 | 7 | 1 | 3 | 2 |
| $x_8$ | 4 | 8 | 5 | 9 | 6 | 7 | 3 | 1 | 2 |
| $x_9$ | 4 | 8 | 5 | 9 | 6 | 7 | 2 | 3 | 1 |

Creating the ranking matrix $F_{ij}$ ($\eta=3$) gives

|       |     |     |     |     |     |     |     |     |     |
|-------|-----|-----|-----|-----|-----|-----|-----|-----|-----|
| $x_1$ | 1   | 0   | 1/2 | 0   | 0   | 0   | 0   | 1/3 | 0   |
| $x_2$ | 1/2 | 1   | 1/3 | 0   | 0   | 0   | 0   | 0   | 0   |
| $x_3$ | 1/2 | 0   | 1   | 0   | 0   | 0   | 0   | 1/3 | 0   |
| $x_4$ | 0   | 0   | 0   | 1   | 1/3 | 1/2 | 0   | 0   | 0   |
| $x_5$ | 0   | 0   | 0   | 0   | 1   | 1/2 | 0   | 1/3 | 0   |
| $x_6$ | 0   | 0   | 0   | 1/3 | 1/2 | 1   | 0   | 0   | 0   |
| $x_7$ | 0   | 0   | 0   | 0   | 0   | 0   | 1   | 1/3 | 1/2 |
| $x_8$ | 0   | 0   | 0   | 0   | 0   | 0   | 1/3 | 1   | 1/2 |
| $x_9$ | 0   | 0   | 0   | 0   | 0   | 0   | 1/2 | 1/3 | 1   |

Computing the pairwise distances $\|F_i - F_j\|$ gives:

|       | $x_1$ | $x_2$ | $x_3$ | $x_4$ | $x_5$ | $x_6$ | $x_7$ | $x_8$ | $x_9$ |
|-------|-------|-------|-------|-------|-------|-------|-------|-------|-------|
| $x_1$ |       | 1.39  | 0.5   | 2.72  | 2.5   | 2.72  | 2.5   | 3.05  | 2.58  |
| $x_2$ |       |       | 1.56  | 2.72  | 2.61  | 2.72  | 2.72  | 2.72  | 2.72  |
| $x_3$ |       |       |       | 2.72  | 2.61  | 2.72  | 2.61  | 2.05  | 2.5   |
| $x_4$ |       |       |       |       | 1.56  | 0.72  | 2.72  | 2.72  | 2.72  |
| $x_5$ |       |       |       |       |       | 0.72  | 2.5   | 2.05  | 2.5   |
| $x_6$ |       |       |       |       |       |       | 2.72  | 2.72  | 2.72  |
| $x_7$ |       |       |       |       |       |       |       | 0.89  | 0.5   |
| $x_8$ |       |       |       |       |       |       |       |       | 0.72  |
| $x_9$ |       |       |       |       |       |       |       |       |       |

The property that $\|F_i - F_j\| < \|F_i - F_k\|$, if Speaker($x_i$)=Speaker($x_j$), and Speaker($x_i$)≠Speaker($x_k$), is clearly demonstrated again. The actual value for $\eta$ may be determined empirically, depending on the amount of data collected.

Based on the criterion of the distance between the ranking vectors, the blind clustering of utterances by speaker can be formulated as a problem of conventional vector clustering. The persons skilled in the art may use any suitable clustering algorithm. For example, the well-developed k-means clustering algorithm can be employed to solve it. However, to prevent the embarrassment of null partition that will probably happen in this application, it is preferred to use the k-means algorithm modified as follows:

Step 1: Initialization. Set number of clusters k=2. Arbitrarily choose a vector, say $F_i$, as delegate of the cluster $C_1$. Then, choose the vector that is farthest from $F_i$ (in terms of the chosen distance measure, such as the Euclidean distance) as delegate of the cluster $C_2$.

Step 2: Nearest-neighbor search. For each vector $F_j$, find one of the delegates in each of the clusters that is nearest to $F_j$, and then assign $F_j$ to the corresponding cluster associated with the nearest delegate.

Step 3: Splitting. For all clusters, find the vector that is farthest from the delegate of its current belonging cluster. The vector then becomes the delegate of a new cluster. Set k=k+1.

Step 4: Iterate Steps 2 and 3 until k=M.

Figure 3:
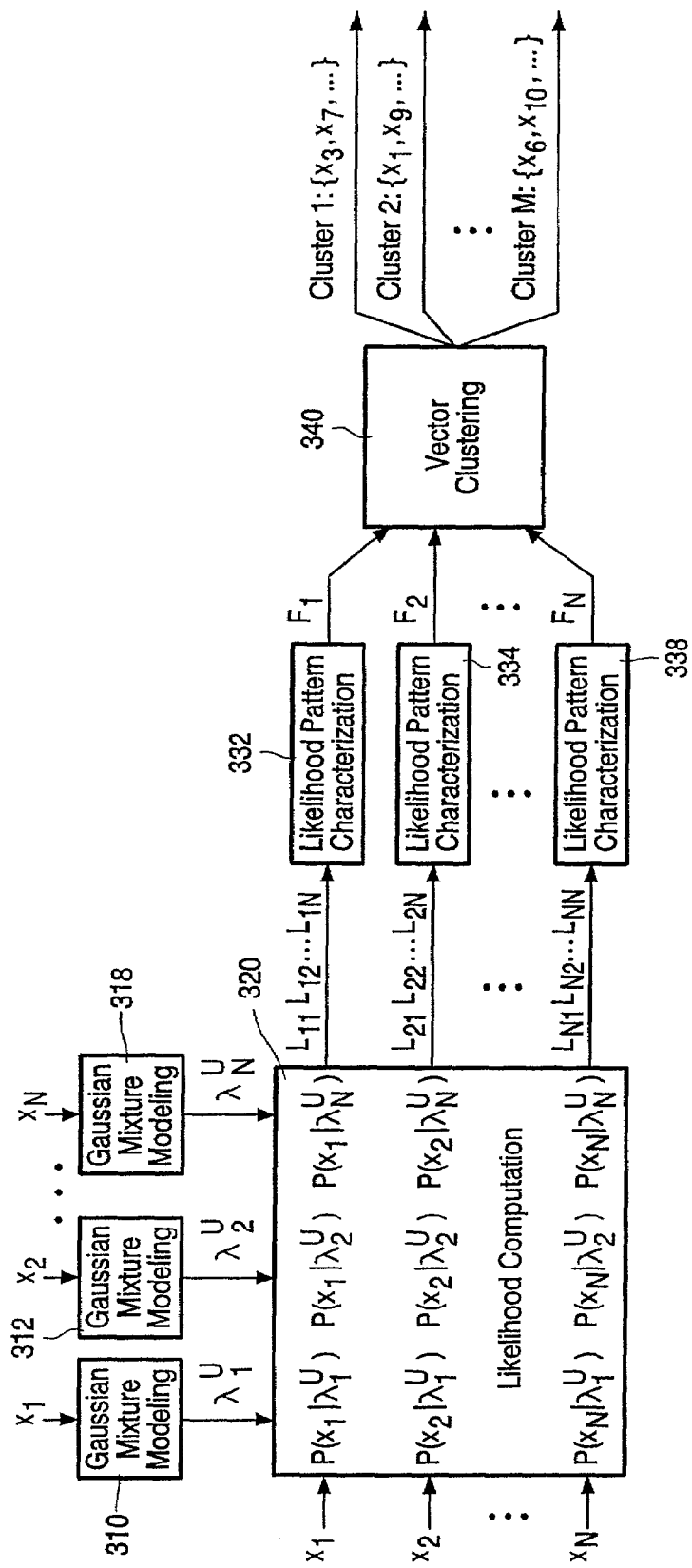
FIG. 3 shows a block diagram of the blind clustering.

FIG. 3 shows a block diagram of the blind utterance clustering according to the invention. In the blocks 310, 312, ..., 318 for each of the utterances $x_i$ a corresponding model $\lambda_i^U$ is created. In block 320, for each of the utterances $x_i$ the likelihoods of the utterances for each of the models is calculated. This gives for each of the utterances a likelihood vector $L_i = [L_{i1}\ L_{i2} \ldots L_{iN}]^T$. In the block 332, to 338 for each of the utterances $x_i$, a respective ranking vector $F_i = [F_{i1}, F_{i2} \ldots, F_{iN}]^T$ is calculated based on the relative likelihood of the elements of its likelihood vector $L_i$. In block 340 the utterances $x_i$ are clustered based on a distance criterion between the ranking vectors of the utterances.

EXPERIMENTAL RESULTS

Speech Database

The database used for testing the system according to the invention consisted of 5000 utterances produced by 100 speakers (50 males and 50 females). Each speaker gave 50 utterances, recorded in three sessions. These utterances range in duration from 2 to 5 seconds. The entire 100 speakers were served as clients, that is P=Q=100. The database was further divided into three subsets, respectively denoted as DB-1, DB-2, and DB-3. The first subset DB-1 consisted of 20 utterances per speaker (roughly corresponding to 80-second overall duration) and served as off-line collected data. The second subset DB-2 consisted of distinct 10 utterances that did not include the speech segments in DB-1. Each of the utterances in DB-2 was used as the enrollment data of clients. The third subset DB-3 consisted of remainder 20 utterances and served as test set for speaker-ID experiments. All of the utterances were recorded in a relatively quiet environment and sampled at 22.05 kHz with 16-bit precision. Speech features including 21 MFCCs (the zero-th coefficient is not used) were then extracted for every 20-ms Hamming-windowed frame with 10-ms frame shifts.

Cluster Evaluation

Because the effectiveness of the speaker identification (ID) system crucially depends on how well the off-line collected utterances are clustered, it is necessary to evaluate the efficiency of the utterance clustering method prior to performing speaker-ID experiments. The quality of the partitioning was measured by means of cluster purity. The purity is a quantity which describes the extent that all utterances in a cluster are from the same speaker. For cluster m, the purity is defined as $$p_m = \frac{1}{n_m^2} \sum_{k=1}^{n_m} n_{mk}^2, \qquad (6)$$

where $n_m$ is the number of utterances in the cluster m, and $n_{mk}$ is the number of utterances in the cluster m that were spoken by speaker $S_k$. Calculation of this measurement requires knowledge of the true attribute of each utterance. The overall efficiency of the clustering method is evaluated in terms of average purity $$\bar{p} = \frac{1}{N} \sum_{m=1}^{P} p_m n_m. \quad (7)$$

Figure 4:
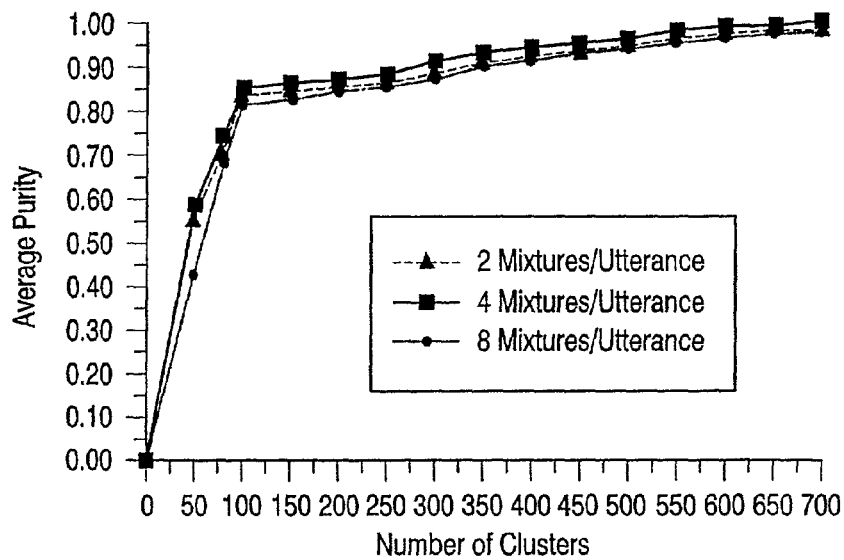
FIG. 4 illustrates the utterance clustering efficiency.

Computer simulations were conducted on DB-1 to examine the blind utterance clustering. The number of Gaussian mixtures per utterance varied from 2 to 8 were run, and the parameter η was set to (N/M) throughout the experiments. FIG. 4 shows the average purity versus the number of clusters used. When the number of clusters is equal to the speaker population size (M=P=100), an average purity of 0.86 is obtained. As the number of cluster increases, the purity increases. The utterances from different speakers could be perfectly separated when 700 clusters were used. The results also show that the clustering were insensitive to the number of mixtures per utterance used. In the sequel, the clustering results obtained by 4 mixtures/utterance were used to perform speaker-ID experiments.

Speaker-ID Experiments

First, a baseline system that operates in conventional supervised way was evaluated for performance comparisons. Two sets of experiments were conducted here to investigate the system performance with respect to different amount of training data. In the first set of experiments, models for specific speakers were trained using 20 utterances/speaker in DB-1 along with true speaker attributes. After that, 20 utterances/speaker in DB-3 were in turn used to test the system, and the speaker-ID accuracy was then computed as the percentage of correctly identified utterances over all test utterances. The speaker-ID accuracy was also measured with respect to different number of Gaussian mixture densities per speaker model varied from 2 to 32. In the second set of experiments, each speaker model is trained using one utterance chosen from DB-2.

This experimental setting can be considered as using sparse data in training speaker models. Additionally, to obtain statistically significant results, each distinct utterance from DB-2 was chosen once, and similar experiments were run for ten trials. The average speaker-ID accuracy was finally computed. The following table gives the speaker-ID accuracy using results for the two sets of experiments. It can be seen that the conventional speaker-ID system based on supervised training of GMMs performs very well when a large amount of enrollment data was used, while the performance drops drastically when only sparse enrollment data was used. Tabulate data also indicates an upper bound and lower bound performance of the speaker ID based on our proposed unsupervised learning.

|  | Number of mixtures | | | | |
| --- | --- | --- | --- | --- | --- |
| Training data | 2 | 4 | 8 | 16 | 32 |
| 20 utterances per speaker | 94.1% | 97.6% | 99.4% | 99.9% | 99.8% |
| 1 utterance per speaker | 55.6% | 57.1% | 51.4% | 43.3% | 40.1% |

Figure 5:
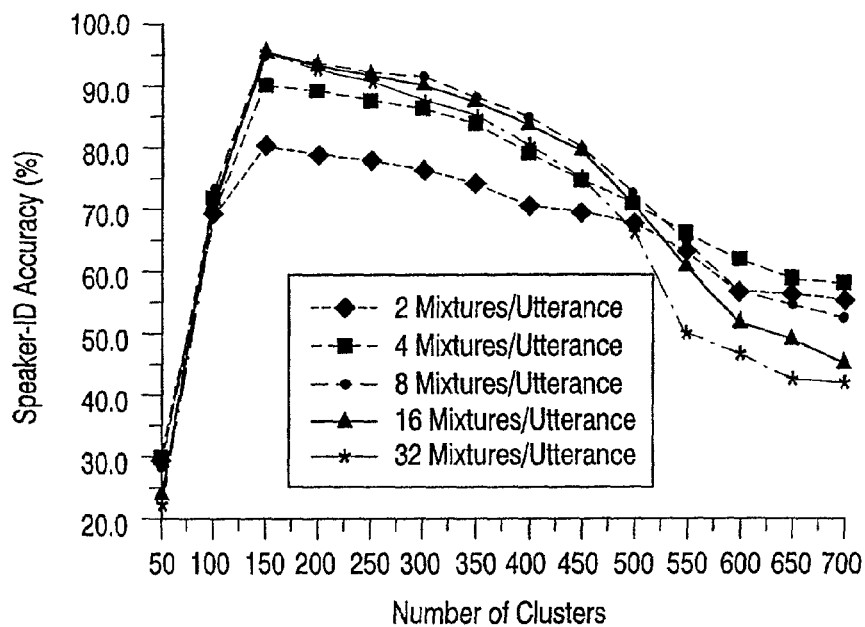
FIG. 5 shows the speaker identification performance of the system.

Next, experiments were conducted to test the validity of the speaker-ID system according to the invention. Determining adequate number of clusters needed to represent different speakers is the first step in applying background learning to the speaker-ID problem. As mentioned previously, the higher number of clusters are used, the higher purity can be achieved. However, large amount of clusters will run the risk of using sparse data in training speaker models. For this reason, the following experiments were conducted to investigate the effect of speaker-ID performance with respect to the number of clusters and the number of mixtures per speaker model used. Additionally, to obtain statistically significant results, ten trials with distinct enrollment utterance per speaker chosen from DB2 were run, and the average speaker-ID accuracy was then computed. FIG. 5 summarizes the speaker-ID results. The best speaker-ID accuracy of 95.6% was achieved by using 150 clusters along with 4 mixtures per speaker model. When the number of clusters increases, the speaker-ID accuracy decreases gradually. The results suggest that the adequate number of clusters can be chosen to be slightly larger than the speaker population size (if it is known in advance). It is preferred that utterances from the same speaker occupy more than one cluster rather than utterances from different speakers are grouped into the same clusters. Compared with the results in the table above, it is clear that the performance of speaker-ID using sparse enrollment data can be improved greatly through the background learning of speaker's voices. The results also demonstrate that the proposed unsupervised learning scheme can compete with the conventional supervised one for speaker ID.

The background learning method simplifies the use of speaker identification and as such opens the way to use speaker identification in more CE systems. Unlike the conventional speaker ID, the background learning method according to the invention does not rely on a user explicitly enrolling and training the system for constructing speaker-specific models, but instead attempts to learn speakers' voices via clustering and parametric modeling of off-line collected speech signal in an unsupervised manner. This eliminates the necessity of enrolling a large amount of speech data from users. As described above, to prepare a system for use, the following two steps are required:

The blind clustering for off-line speech utterances is performed according to the described algorithm Speaker tagging is performed as described above for block 122 of FIG. 1. In the examples given below, a personal approach is used towards the user. As such, personal information of the user is required, like the name of the user. For certain applications it may be sufficient to distinguish between different users, making it not necessary to add personal information.

Apart from the conventional enrollment for speaker recognition, the system according to the invention enables two new ways of enrollment, depending on the amount of collected speaker data collected. The first one is an automatic enrollment procedure generated by system. It might be called "old-friend greeting enrollment". The scenario is as follows:

While the system has been active for a period of time (for example, using speaker independent voice control or only collecting speaker data in the background), the system automatically has collected utterances of the user and has constructed speaker models using the described background learning method.

If at a certain moment one of speakers passes the confidence measure (i.e. the likelihood of an utterance (e.g. a voice command used to control the system) compared to one of the models has passed a predetermined threshold), the system provides an automatic enrollment. This may take the form of an old-friend greeting, where the system may say "Hello, my dear friend. I hear a familiar sound from you again, could you provide me your name?" using prerecorded messages or speech synthesis.

After the enrollment, the system can identify the speaker by his/her voice.

The system may store the personal information in any suitable form in association with the speech model identified for the speaker. For example, the speaker may have supplied personal information by speaking his/her name. The system may store this name in a form representing the speech. A next time, the same speaker speaks to the system, the system may regenerate the recorded speech, if desired by using speech synthesis techniques to let the recorded name sound in a way as is normal for the system. The system may also recognize the name using speech recognition techniques and store a recognized representation, such as a textual form. The system may also ask the user to type in the name and store this textual representation.

A second form of enrollment is performed if not enough training data is available at the moment speaker identification is required for the first time. The system will ask the user to speak more utterances. The number of input utterances required depends on the data that has already been collected. Once a sufficient level of confidence has been achieved, a speaker model adaptation is performed using any suitable model adaptation algorithm. This form of enrollment can be seen as "easy enrollment via adaptation". The user needs only to speak a few adaptation data to construct a speaker model. Compared to conventional approaches, this form of enrollment takes less time.

Personalized and Interactive Voice-Controlled System

Figure 6:
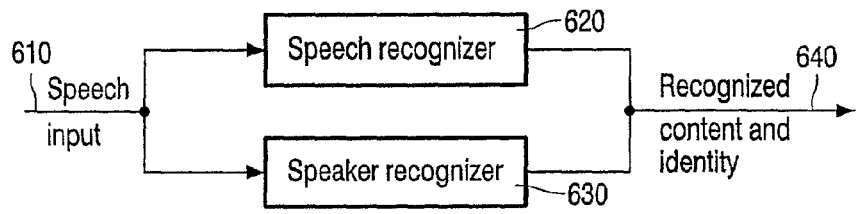
FIG. 6 shows the use of speaker identification in a voice control system.

In traditional voice-controlled systems, personalized and interactive features are not well integrated with the voice control functionality. Normally, users can control the device via voice, while the person at the same time may be busy doing other things. For example, the television can be activated using a voice command "ON". In conventional voice control systems there is no provision to automatically tune the TV set to a personal default program or other personal settings while turning on the device. For an effective personal user-interface it is desired that the speaker is automatically identified. The speaker identification technology according to the invention can effectively be used to this end and as such enables new features for voice-controlled systems. For example, when the father David turns on the TV, the channel is defaulted to "sport" which is the favorite channel according to his profile. When a 2-year old child Tom activates the TV via voice the Disney channel may be selected automatically. This feature makes the devices friendlier. Particularly for very young children it also makes it possible to control the device unassisted. Preferably, the parent is able to influence the profile of the child. Incorporating speaker identification technology, voice-controlled systems can response in different manners for different users. A block diagram of a combined speech/speaker recognition system is shown in FIG. 6. The speech input 610 is sent to a speech recognizer 620, that may be optimized for recognizing voice commands, and to a speaker recognizer 630. The recognizers preferably operate in parallel, but a sequential operation may also be acceptable. The recognizers generate as output 640 the recognized content (e.g. a voice command) and the identity of the speaker. According to the invention, a same utterance is used for recognizing a voice command and identifying the speaker. The recognized command is then executed in a speaker-dependent way.

Speaker identification can also advantageously be used to verify whether a person is allowed to operate a device (e.g. use a mobile phone) or perform certain operation, like watching adult channels. In personalized and interactive voice-controlled system, personal profiles and content can be built automatically by analyzing the program records of voice-controlled devices. The profile represents the user's habit to the voice-controlled system. The system can use the profile to default user's programs/settings or provide kind suggestions like a friend knowing the user's habit.

The application of speaker identification as described above can be used in combination with the background training of the identification system according to the invention, making the system more user friendly. It will be understood that the same applications can also be used if the system is trained in a different way.

The invention claimed is:

1. A method of automatically identifying a speaker; the method including:
identifying a speaker by:
receiving a test utterance from the speaker;
determining a most likely one of a plurality of speaker models for the test utterance; and
identifying the speaker associated with the most likely speaker model as the speaker of the test utterance;
wherein the method includes generating the plurality of speaker models in the background by:
receiving training utterances from a pool of utterances from the plurality of speakers in the background, without prior knowledge of the speakers who spoke the respective training utterances;
blind clustering of the training utterances from the pool of utterances based on a predetermined criterion, wherein the blind clustering includes calculating a likelihood vector for each training utterance; and
non-explicitly training for each of the clusters a corresponding speaker model, each of the models representing a speaker.

2. A method as claimed in claim 1, wherein the step of blind clustering of the training utterances $x_i$, i<N based on the predetermined criterion includes:
modeling each respective one of the training utterances $x_i$ by a respective model $\lambda_i$;
calculating for each training utterance $x_i$ a corresponding likelihood vector $L_i$, where each vector element $L_{ij}$, $1 \leq j \leq N$ represents a likelihood of the training utterance $x_i$ against a respective one of the models $\lambda_j$;
determining for each training utterance $x_i$ a corresponding ranking vector $F_i$, where each element $F_{ij}$ of the ranking vector $F_i$ is assigned a ranking value representing a ranking of the corresponding likelihood $L_{ij}$ compared to the other elements of the likelihood vector $L_i$ such that a higher likelihood value of $L_{ij}$ is reflected by a higher ranking value of $F_{ij}$;
clustering the training utterances $x_i$ based on a criterion that a minimum in a distance measure between $F_i$ and $F_j$ indicates that the training utterances $x_i$ and $X_j$ originate from a same speaker.

3. A method as claimed in claim 2, wherein the ranking is such that $\eta$ lowest likelihood values of the elements $L_{ij}$ of the likelihood vector $L_i$ are represented by distinct values of the corresponding elements $F_{ij}$ of the ranking vector $F_i$, and that the remaining N-$\eta$ elements $L_{ij}$ of the likelihood vector $L_i$ are represented by a same predetermined ranking value of the corresponding elements $F_{ij}$ of the ranking vector $F_i$, where $\eta$ represents an expected number of training utterances per cluster, and the predetermined ranking value being lower than any of the $\eta$ distinct ranking values.

4. A method as claimed in claim 1, wherein the method includes:
receiving an enrolment utterance from a speaker,
determining a most likely one of a plurality of speaker models for the enrolment utterance;
receiving identifying information of the speaker; and
storing the identifying information in association with the most likely speaker model.

5. A method as claimed in claim 4, wherein the method includes:
verifying whether a likelihood of the most likely speaker model is above a predetermined threshold; and
if the likelihood is below the predetermined threshold, requesting a further utterance from the speaker, and iteratively
receiving the further utterance;
adapting the most likely speaker model with the further utterance; and
determining the likelihood of the adapted speaker model;
until the likelihood is above the predetermined threshold.

6. A method as claimed in claim 1, wherein the steps of recording training utterances, blind clustering the utterances and training the speaker models is performed iteratively until a predetermined level of confidence has been achieved.

7. A method as claimed in claim 6, wherein in response to achieving the predetermined confidence level the speaker is automatically requested to provide information identifying the speaker, followed by receiving the identifying information and storing the identifying information in association with the most likely speaker model.

8. A method as claimed in claim 1, wherein the method includes, in response to having identified the speaker, automatically retrieving a personal profile for interacting with a CE (consumer electronics) device.

9. A method as claimed in claim 1, wherein the method includes recognizing the test utterance used for identifying the speaker as a voice command; and executing the recognized voice command in a speaker-dependent way.

10. A computer program product comprising a computer readable medium into which is embodied a computer program operative to cause a processor to perform the method as claimed in claim 1.

11. A system for automatically identifying a speaker; the system includes:
a speaker identifier operative to identify a speaker by:
receiving a test utterance from the speaker;
determining a most likely one of a plurality of speaker models for the test utterance; and
identifying the speaker associated with the most likely speaker model as the speaker of the test utterance; and
a speaker model generator operative to generate the plurality of speaker models, wherein the speaker model generator is operative to generate the plurality of speaker models in the background by:
receiving training utterances from a pool of utterances from the plurality of speakers in the background, without prior knowledge of the speakers who spoke the respective training utterances;
blind clustering of the training utterances from the pool of utterances based on a predetermined criterion, wherein the blind clustering includes calculating a likelihood vector for each training utterance; and
non-explicitly training for each of the clusters a corresponding speaker model, each of the models representing a speaker.

12. A method for automatically identifying based on speech, comprising:
receiving training utterances from a pool of utterances from the plurality of speakers;
performing blind clustering of the received training utterances from the pool of utterances based on a predetermined criterion to produce clusters, wherein the blind clustering includes calculating a likelihood vector for each training utterance;
non-explicitly training, for said clusters, corresponding speaker models representing associated speakers;
receiving a test utterance from a speaker;
determining a most likely one of said speaker models for the test utterance; and
identifying a speaker associated with the determined most likely speaker model as the speaker of the test utterance,
wherein said receiving training utterances occurs in the background, without prior knowledge of the speakers who respectively spoke said training utterances, and said speaker models are generated in the background.

13. A method as claimed in claim 12, wherein said blind clustering comprises:
the generating of the speaker models for respective ones of said received training utterances;
calculating, for said received training utterances, corresponding likelihood vectors, whose elements individually represent likelihood of a respective one of the training utterances based on a multiple ones of the models;
forming, for the training utterances, corresponding ranking vectors,, whose elements are assigned corresponding ranking values representing relative ranking of likelihood compared to other elements of a respective one of the likelihood vectors; and
clustering the training utterances based on a criterion that judges training utterances to have originated from the same speaker based on distance between ones of said corresponding ranking vectors.

14. A method as claimed in claim 12, wherein said blind clustering comprises clustering the training utterances according to distance between ones of ranking vectors which respectively indicate likelihood of a particular one of said training utterances based on a plurality of said models.

15. The method of claim 14, wherein said clustering of training utterances is based on a criterion that a minimum in a distance measure between pairs of ranking vectors indicates that a respective pair of said training utterances originate from a same speaker.

16. The method of claim 14, wherein at least some of said ranking vectors utilized in said clustering the training utterances relate to utterances of a same speaker.

17. The method of claim 16, wherein said ranking vectors which respectively indicate likelihood are divided into groups, each group relating to utterances of a single speaker particular to that group.

18. A method as claimed in claim 12, wherein the method includes, in response to having identified the speaker, automatically retrieving a personal profile for interacting with a CE (consumer electronics) device.

19. A method as claimed in claim 12, wherein the method includes recognizing the test utterance used for identifying the speaker as a voice command; and executing the recognized voice command in a speaker-dependent way.

20. A computer program product comprising a computer readable medium into which is embodied a computer program operative to cause a processor to perform the method as claimed in claim 12.

* * * * *